US007158800B2

(12) United States Patent
Stephens et al.

(10) Patent No.: US 7,158,800 B2
(45) Date of Patent: Jan. 2, 2007

(54) METHOD AND SYSTEM FOR LIMITING CONTENT DIFFUSION TO LOCAL RECEIVERS

(75) Inventors: Spencer Stephens, Toluca Lake, CA (US); Alan Bell, San Marino, CA (US)

(73) Assignee: Warner Bros. Entertainment Inc., Burbank, CA (US)

( * ) Notice: Subject to any disclaimer, the term of this patent is extended or adjusted under 35 U.S.C. 154(b) by 105 days.

(21) Appl. No.: 10/978,669

(22) Filed: Nov. 1, 2004

(65) Prior Publication Data

US 2005/0160450 A1 Jul. 21, 2005

Related U.S. Application Data

(60) Provisional application No. 60/516,538, filed on Oct. 31, 2003.

(51) Int. Cl.
*H04Q 7/20* (2006.01)

(52) U.S. Cl. .................. 455/461; 455/404.2; 455/3.04; 455/464; 604/317; 356/300; 380/200

(58) Field of Classification Search ............... 455/41.3, 455/461, 404.2, 3.04; 380/200; 725/34, 725/35, 46
See application file for complete search history.

(56) References Cited

U.S. PATENT DOCUMENTS

| | | | | |
|---|---|---|---|---|
| 6,002,708 | A | 12/1999 | Fleming et al. | |
| 6,405,033 | B1 | 6/2002 | Kennedy, III et al. | |
| 6,636,740 | B1 | 10/2003 | Ramesh | |
| 6,826,699 | B1 * | 11/2004 | Sun | 726/5 |
| 6,925,410 | B1 * | 8/2005 | Narayanan | 702/150 |
| 6,934,851 | B1 * | 8/2005 | Epstein | 713/193 |
| 6,940,120 | B1 * | 9/2005 | Hashimoto et al. | 257/314 |
| 6,970,131 | B1 * | 11/2005 | Percy et al. | 342/357.07 |
| 6,999,533 | B1 * | 2/2006 | Murthy et al. | 375/343 |
| 7,031,294 | B1 * | 4/2006 | Aiello et al. | 370/348 |
| 7,038,619 | B1 * | 5/2006 | Percy et al. | 342/357.07 |
| 2002/0136407 | A1 | 9/2002 | Denning et al. | |

FOREIGN PATENT DOCUMENTS

| | | | |
|---|---|---|---|
| WO | WO-01/93434 | A2 | 12/2001 |
| WO | WO-03/075125 | A2 | 9/2003 |

OTHER PUBLICATIONS

International Search Report dated Aug. 2, 2005; in corresponding PCT/US04/36271 filed Nov. 1, 2004; published as WO 2005/043797 on May 12, 2005; Applicant: Warner Bros. Entertainment Inc.; Inventors: Spencer Stephens, Alan Bell.

(Continued)

*Primary Examiner*—Marceau Milord
(74) *Attorney, Agent, or Firm*—Gottlieb, Rackman & Reisman, P.C.

(57) ABSTRACT

Content is distributed from a source to a sink only if the sink is within a predetemined distance from a source. In one embodiment, a control signal is sent over a limited range channel to the sink and the content is then sent only if the control signal is received properly by the sink. In another embodiment, the content is encrypted and the encryption key is sent over the limited range channel. The content is also sent to the sink, but the sink cannot decode the content unless it has a proper copy of the decoding key. The control signal can be sent over a wireless channel, an IR channel, or an AC line. The content is sent over the Internet, either using a standard wired channel or over a wireless channel.

23 Claims, 4 Drawing Sheets

OTHER PUBLICATIONS

PCT Written Opinion dated Aug. 2, 2005; in corresponding PCT/US04/36271 filed Nov. 1, 2004; published as WO 2005/043797 on May 12, 2005; Applicant: Warner Bros. Entertainment Inc.; Inventors: Spencer Stephens, Alan Bell.

* cited by examiner

PRIOR
ART

METHOD AND SYSTEM FOR LIMITING CONTENT DIFFUSION TO LOCAL RECEIVERS

RELATED APPLICATION

This application claims priority to provisional application Ser. No. 60/516,538 filed Oct. 31, 2003, and incorporated herein by reference.

BACKGROUND OF THE INVENTION

1. Field of Invention

This invention pertains to a method and system in which content is sent or can be utilized only by sinks that are within a specified maximum distance from a source.

2. Description of the Prior Art

The fundamental problem addressed by the invention is that there is currently no way to guarantee (with high confidence) that a content sink device (e.g., television) is actually within the same users home, business, or other geographically-limited region as the content source device (e.g., a set-top box) to which the content owner desires to limit the distribution, reproduction, or playback of his content. For example, generally, if the source and the sink are connected through the Internet then they might be on opposite sides of the earth.

A case of special concern involves the use of Digital Transmission Content Protection (DTCP) (http://www.dtcp-.com) protocol for copy protection over IEEE 1394, USB, MOST, and IP networks. DTCP only "secures" the link between the (5C) source and sink; there is no built-in notion of proximity between the source and sink devices. Part of the problem is solved by the (5C) standard, which guarantees (with high confidence) that a receiver is actually authorized to decode/store/playback (5C) encoded content. However, it is possible that the authorized (5C) receiver may be located too far away from the (5C) source, according to the content owner. So the (5C) standard per se does not solve the problem of limiting the geographic diffusion of content. Techniques that attempt to identify the receiving content user, for example by having the user enter a PIN or insert a smart card into the receiver are helpful in limiting the undesired diffusion of content, but do not address the fundamental problem that the receiving user may have placed the receiving device "too far away" from the potential content source. There are many known ways of determining the geographic location of an object.

"Triangulation" has been used for many years to establish the location of objects that emit electromagnetic radiation. This involves the use of two or more receivers with directional antennae and a geographic information database, such as a map. Given the known locations and directions of maximal received signal strength at the receivers, it is easy to find the transmitter location as the point at which lines drawn on the map from each receiver to "infinity" in the direction of maximal signal strength, intersect. In this case, the cooperation of the transmitter is not necessary, and, in fact, triangulation is often employed to locate unauthorized transmitters. A triangulation-based approach may serve the purpose of this invention, but only if the content receiver emits electromagnetic radiation, and two or more triangulation receivers are available.

More recently, it has become common for receivers to establish their positions using a Global Positioning System (GPS), which relies on measuring the differential delays of several signals transmitted from an array of GPS satellites.

If the content receiver includes a GPS receiver and "return-channel" transmitter, it can convey its location back to the content source. The content source may be assumed to include a GPS receiver and/or a geographic database and means for calculating its distance from the content receiver. However, GPS does not work reliably indoors, and a receiver may be set with an incorrect location code as well.

Localization techniques that use so-called "ultra-wide-band (UWB) radio" have also recently been described. For example, see U.S. Pat. No. 6,002,708: "SPREAD SPECTRUM LOCALIZERS", assigned to Aether Wire & Location, Inc.

Techniques are also known whereby proximity of receivers to transmitters is established using Round-Trip Time (RTT) measurements between a transmitted signal from the source to the sink and the corresponding return signal. In the case of a single cooperating transmitter-receiver pair, this RTT measurement may be sufficient to establish that the receiving device is "close enough" to the transmitting device that the receiving device should be authorized to decode/store/playback a specified amount of content.

One proposed, anti-diffusion solution involves the source setting the "Time to Live" (TTL) field to three in (IP) packets. This assumes that packets will traverse no more than three routers within a home network, else it is assumed that they have left the bounds of the home (some research shows that packets must typically traverse six routers to get beyond the ISP to which the home network is connected) and the third router encountered by the packet should "kill" (i.e., discard) it. A second potential solution is the measurement of RTT using DTCP-level ping messages.

Another proposed solution is to require that the Wired Equivalency Protocol (WEP) be employed on (partly or wholly) wireless local networks. This addresses the cases of "unintentional sharing" of content that may occur simply by virtue of an unintended receiver being within range of a wireless content source due to:

1. innocent co-location, e.g., reception by one's neighbor, or
2. eavesdropping, e.g., by "freeloaders" parking vehicles within reception range of unprotected wireless networks.

The article http://www.spectrum.ieee.om/WEBONLY/publicfeature/iul03/e911.html describes a number of localization techniques, including other "old" techniques like LORAN not referenced above. It specifically mentions Aether Wire & Location Inc. (Nicasio, Calif.), whose patent is referenced above.

International Patent Application number WO 03/075125 A2 assigned to Enterasys Networks, mentions the use of RTT, among other mechanisms, as a means to authenticate receiving devices in a "location aware data network".

International Patent Application WO 01/93434 A2, assigned to XtremeSpectrum, describes the use of RTT and triangulation to enable/disable a function in a remote device in a network comprising devices that communicate over a UWB wireless medium.

U.S. patent application 20020136407 by Denning, et. al., describes a system/method in which data may only be decrypted at (a) specified geographic location(s). Location information is typically supplied by the GPS.

SUMMARY OF THE INVENTION

The invention pertains to a system and method which rely on techniques that based on certain characteristics of localized networks (e.g., but not limited to, home networks) to limit content diffusion to a desired distance from the source. These techniques are used to authorize reception by sinks within an allowed distance from the source, and prevent reception at a greater distance; the latter specifically includes reception over "long-range" external networks such as the Internet, to which localized networks may be connected.

Several techniques may be employed, in some cases (but not necessarily) in combination, with each other or with the RTT measurement technique.

A. Pinging to Measure Round-Trip Time (RTT).

As indicated above, a potential content receiver must return a response to a "ping" (i.e., "did you hear this?") message from a potential content source to that source. The source then attempts to establish that the potential sink is either "close enough" or "too far away" based on the RTT between the sending of the ping by it and the time that the response to the ping is received by the potential source from the sink.

When this technique is used, before transfer of data is permitted over a DTCP link an RTT determination must be made The RTT is determined empirically from the time it takes to complete a secure authenticated handshake (that shall contain a nonce) between the source and sink devices. There is no limit on the number of retries that a source device can make to determine an RTT value. For reasonable network topologies and configurations, the impact to consumer-perceptible performance of conducting multiple RTT measurements should be taken into consideration. The term "nonce" is defined as a random or non-repeating value that is included in data exchanged by a protocol, usually for the purpose of guaranteeing liveness and thus detecting and protecting against replay attacks.

Alternatively, RTT can be measured at the Medium Access Control (MAC) protocol level. Particularly in the case of a wireless network, it is likely that the potential content source will need to retry the ping message (possibly, many times), to establish an RTT value that reliably discriminates between local and distant sinks. For example, in a wireless network the mean RTT may be 100–200 ms, whereas the minimum of a wired network may be a few milliseconds (ms), but the spread in RTT values for the wireless network will potentially encompass values ranging from less than that of a wired network, to a much larger value, e.g., 1 s, so that multiple ping trials will likely be needed to get an RTT value that demonstrates that the sink is not too far away (i.e., a value less than that for a fast wired connection through the Internet).In general, the potential content source must be prepared to ping the potential content sink once (where "once" in this context includes a possibly large number of re-tries) per content exchange session, although it may prove sufficient to ping only once for multiple content exchange sessions, if the content exchange protocol, e.g., DTCP, allows the content receiver to remain authorized over multiple sessions.

In general, if a single RTT meets the designated criteria, the sink may be considered to be within the desired distance of the source.

B. "The Beacon" Technique

A potential content receiver must demonstrate, by referring to a piece of information that the receiver receives from a beacon (i.e., transmitter of the piece of information), to that potential source of the content which it desires to receive, that it is within an acceptable physical distance from the potential content source, by acknowledging reception of that piece of information within an acceptable amount of time. In this technique, the potential receiver should reply with a message saying the equivalent of "I received your message AND here is a piece of information that proves that I correctly understood its content". The return time is determined empirically from the time it takes to complete a secure authenticated handshake. The authentication preferably includes the exchange a nonce between the source and sink devices. As discussed above, a "nonce" is an example of the aforementioned "piece of information" sent by the potential content source. For those scenarios in which it is desired to limit the diffusion of content to a highly-localized geographic area such as a home, the electromagnetic energy emitted by the beacon may be so small as to be "inherently local", i.e., it can only be received within (or very nearly within) the bounds of that highly-localized area.

Preferably, with this technique, the beacon sends a test signal (such as a PING) along a path that includes at least in part a transmission media having a limited range. The return is either over a wired or wireless path.

C. Localization Protocol with Decrypt Key

In another embodiment, a source and a potential sink can exchange data signals over a first data communication channel and an encryption key or other signal is which is sent over a second channel that has a limited range. An acknowledgement from the potential sink that the key is received is also an automatic indication that the potential sink is within the desired range and, accordingly, that the content can be sent. As an example of this technique, using the 5C protocol, a sequence of messages is exchanged between a potential source and sink for the purposes of "discovery" (i.e., source and sink "discover" that they are connected by a network), and authentication (i.e., that the sink is indeed a device that should be allowed to receive the (5C) content). Next, if authentication is successful, a session key is sent from the source to the sink, allowing the sink to decrypt the content. In one embodiment of the invention, the discovery and authentication messages may be sent over the content transfer network connecting the potential source and sink, whereas the session key may be sent over the beacon (which may be e.g., an RF, power line, infrared, or other beacon). Sending the session key over the beacon provides added confidence that the sink must be close enough, as the content cannot be reproduced at the sink without the session key.

DETAILED DESCRIPTION OF THE INVENTION

Figure 1A:
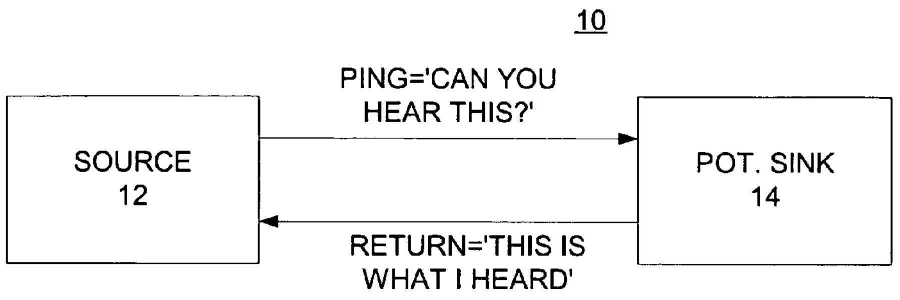
FIG. 1A PRIOR ART
FIG. 1A shows diagrammatically a system in which RTT is used to determine the distance between a content source and the intended sink.
Figure 1B:
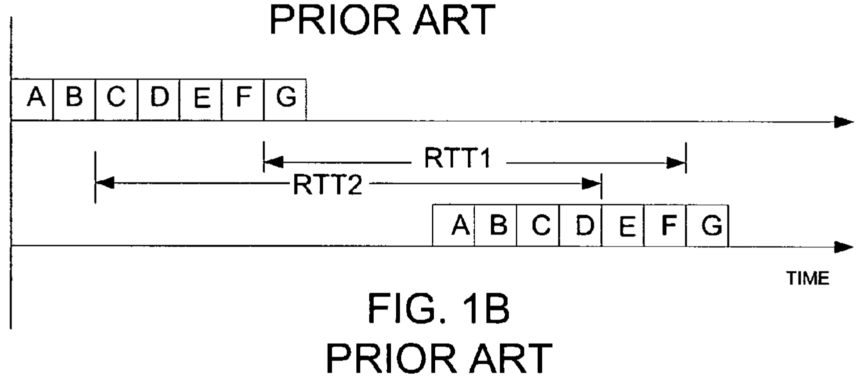
FIG. 1B PRIOR ART
FIG. 1B shows the ping and the return signal used in the system of FIG. 1A.

FIG. 1 a known system 10 in which a source 12 sends a PING signal to a potential sink 14. The PING signal is asking in essence "Can you hear this?" The potential sink generates in response a RETURN signal that says "This is what I heard." In other words, the PING signal has at least one data segment of bits ABCDEFG. The RETURN signal ideally includes the same data segment. Typically, the source 12 and the sink 14 exchange messages over an Internet, an Intranet or other distributed computer networks through one or more intermediate points (not shown). A parameter RTT1 is then defined as the time between the moment a particular portion (for example, significant bit G) is sent, and the moment the same portion is received by the source 12. Alternatively, a parameter RTT2 is defined as the distance between another portion (for example bit C) or even between two portions (bit C of PING and E of the RETURN). These parameters are then related to the distance between the source 12 and the potential sink 14. As discussed above, several PING messages are sent by the source and the parameters RTT1 and or RTT2 are determined from each corresponding RESPONSE. If any of these parameters are below a threshold value, the potential sink 14 is within the desired distance of the source 12.

Figure 2:
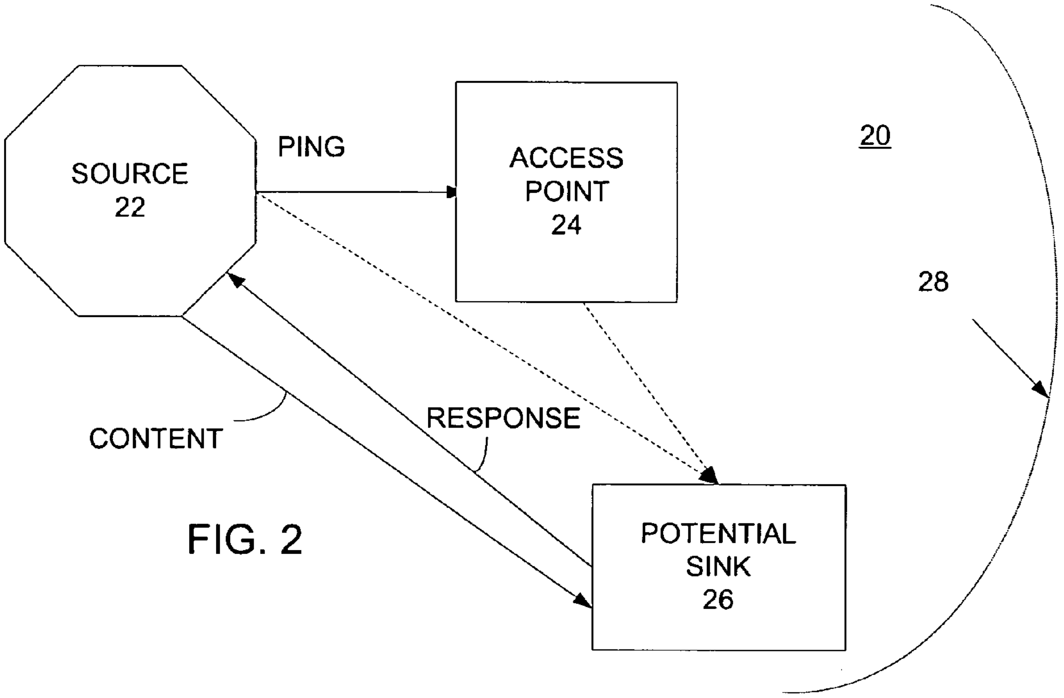
FIG. 2 shows diagrammatically a system in which a beacon is used to determine the distance between a content source and the intended sink.

FIG. 2 gives an example of a system 20 using a localization transmission path with a beacon. The system 20 includes a content source, an access point 24 and a potential sink 26. The source 20 first sends a message (such as a PING). In one embodiment, the message is transmitted to an access point 24, using either a wired or wireless data path. The access point 24 then transmits the message to the potential sink 26. This last portion of the path is preferable using a limited range channel based on a wireless technology such as Bluetooth, 802.11, an IR Channel or an AC (Power line) channel.

If the potential content receiver is too far from the source, i.e., outside the range 28 of the access point 24, then it will not be able to receive the ping, and so will not return a response. If it is close enough, it will return a ping response which indicates that it has not only received a ping, but a ping from that particular source, by including, for example, a nonce in its response. The reply from the sink does not have to come in a beacon reply. The reply could be sent over the general network (including for example, a wired or wireless channel). The content is then sent to the sink using either the same channel as the one used for the PING, the channel used for the PING response, or a different channel.

The beacon generating the ping signal is either the source 22, the access point 24, or some other transmitter. The beacon can also sends its PING signal in other form, for example as a light beam, such as a laser beam, an IR beam, etc.

Figure 3A:
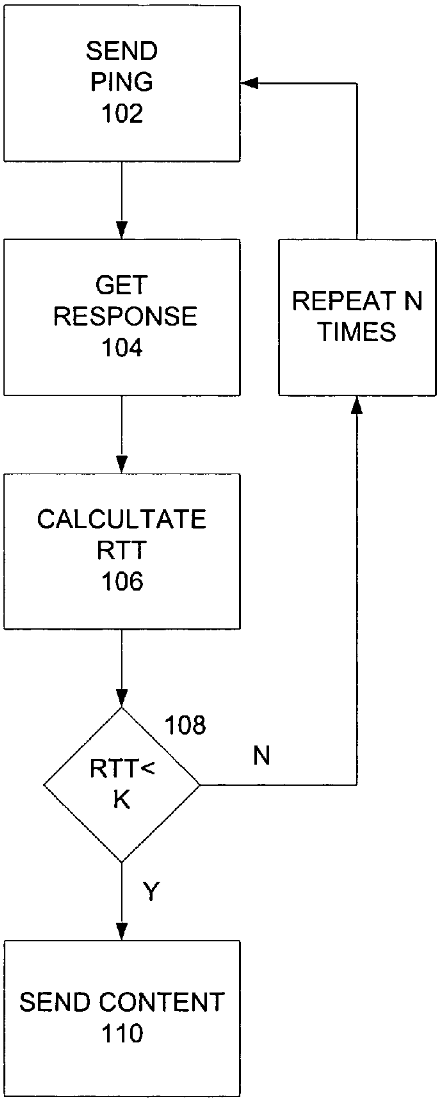
FIGS. 3A, 3B and 3C show flow charts for systems using an RTT technique, a beacon technique and a localization and decrypt key protocol, respectively.
Figure 3B:
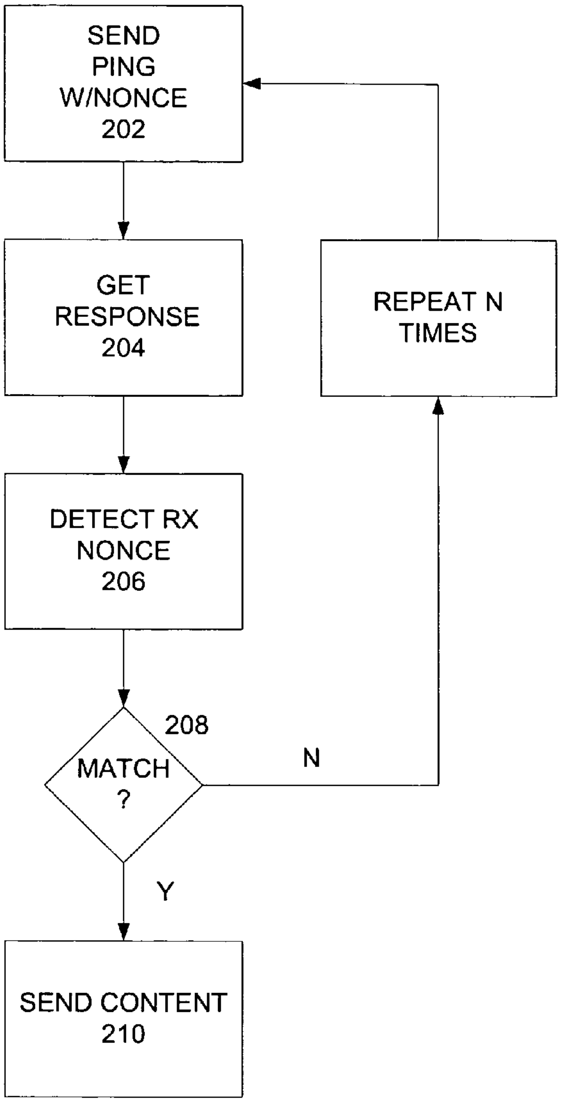

The operation of systems 10 and 20 are contrasted in FIGS. 3A and 3B. As shown in FIG. 3A, system 10 in step 102 sends out a PING signal, and receives a RESPONSE in step 104. In step 106, the corresponding RTT is calculated. In step 108 a check is performed to determine if the current RTT is below a predetermined value or constant K. If it is then, the potential sink 14 is close enough, and in step 110 the content is sent to the potential sink. If RTT is larger then K, the process is repeated several times.

As illustrated in FIG. 3B, system 20 operates as follows. In step 202 the source 22 sends a PING with a nonce. In step 204 a response is received from the potential source with a return nonce. As discussed above, at least the transmission (or a portion of the transmission from the source to the potential sink, or from the sink to the potential source is by way of a channel that has inherently a limited range. In step 206 the received nonce is detected. In step 208 the received nonce is compared to the transmitted nonce. A match indicates that the potential sink 26 is close enough and in step 210 the content is sent to the sink either using a wired or a wireless channel. If no match is detected in step 208, the process is repeated several times.

Figure 3C:
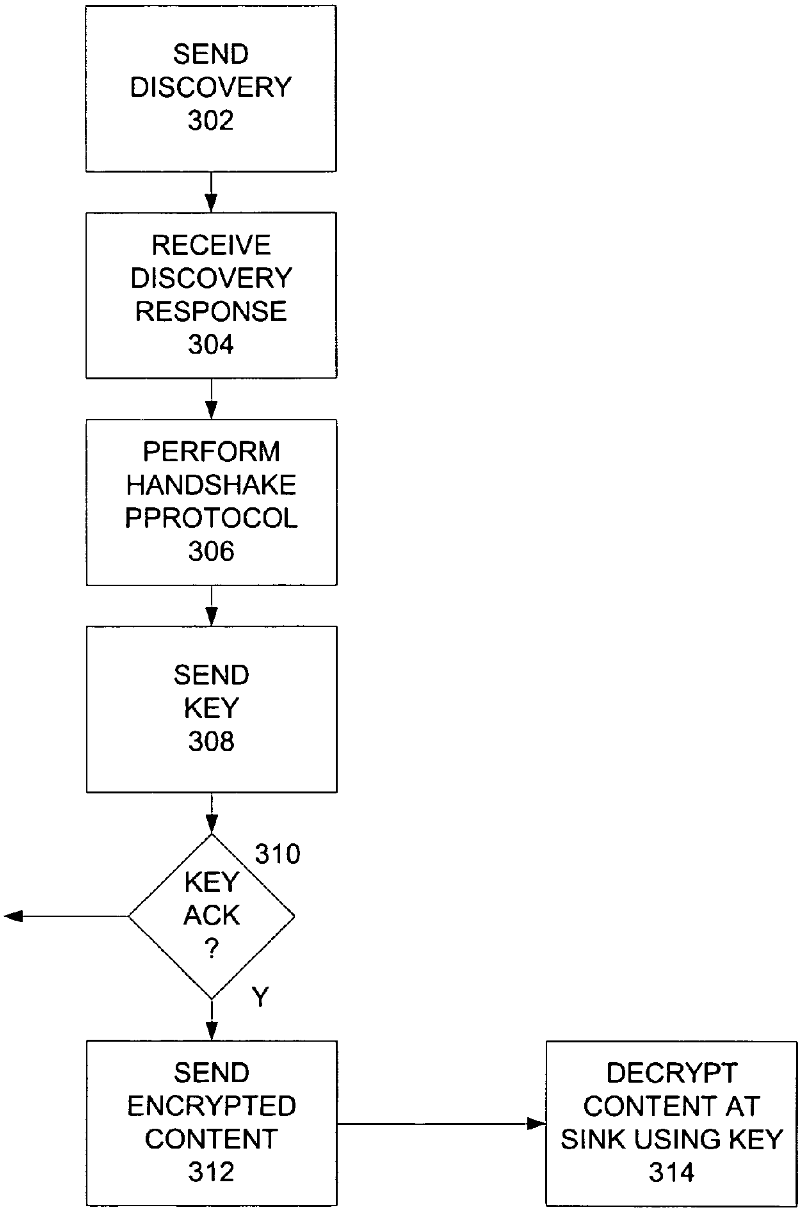

In another embodiment of the invention, two different channels, one being a general channel, having, for instance, a high data capacity, and the second channel having a limited range. However, in this embodiment, some critical data is sent to the sink over the second channel. This critical data is selected to include information without which the content is useless, even if it is successfully transmitted. FIG. 3C shows the operation of such a system. In step 302, the source (or another apparatus) sends either a general signal to discover a potential source, or a specific signal to a specific potential source. In step 304 the sender receives a discovery response indicating that a potential source has been found, in step 306 a handshake protocol is performed. The communications so far take place preferably on a standard communication channel. Next, in step 308 a key is sent to the potential source over a limited range channel. As discussed above, this channel may be a wireless (802.11) channel, an AC line channel, an RF channel, etc.

In step 310 the sender looks for an acknowledgement that the key has been received. If no such signal is received, the process ends. If a correct acknowledgment signal is received, then in step 312 encrypted content is transmitted. This transmission may be on the general channel or on the limited range channel. In step 314 the content is then decrypted by the sink using the key sent in step 308.

Figure 4:
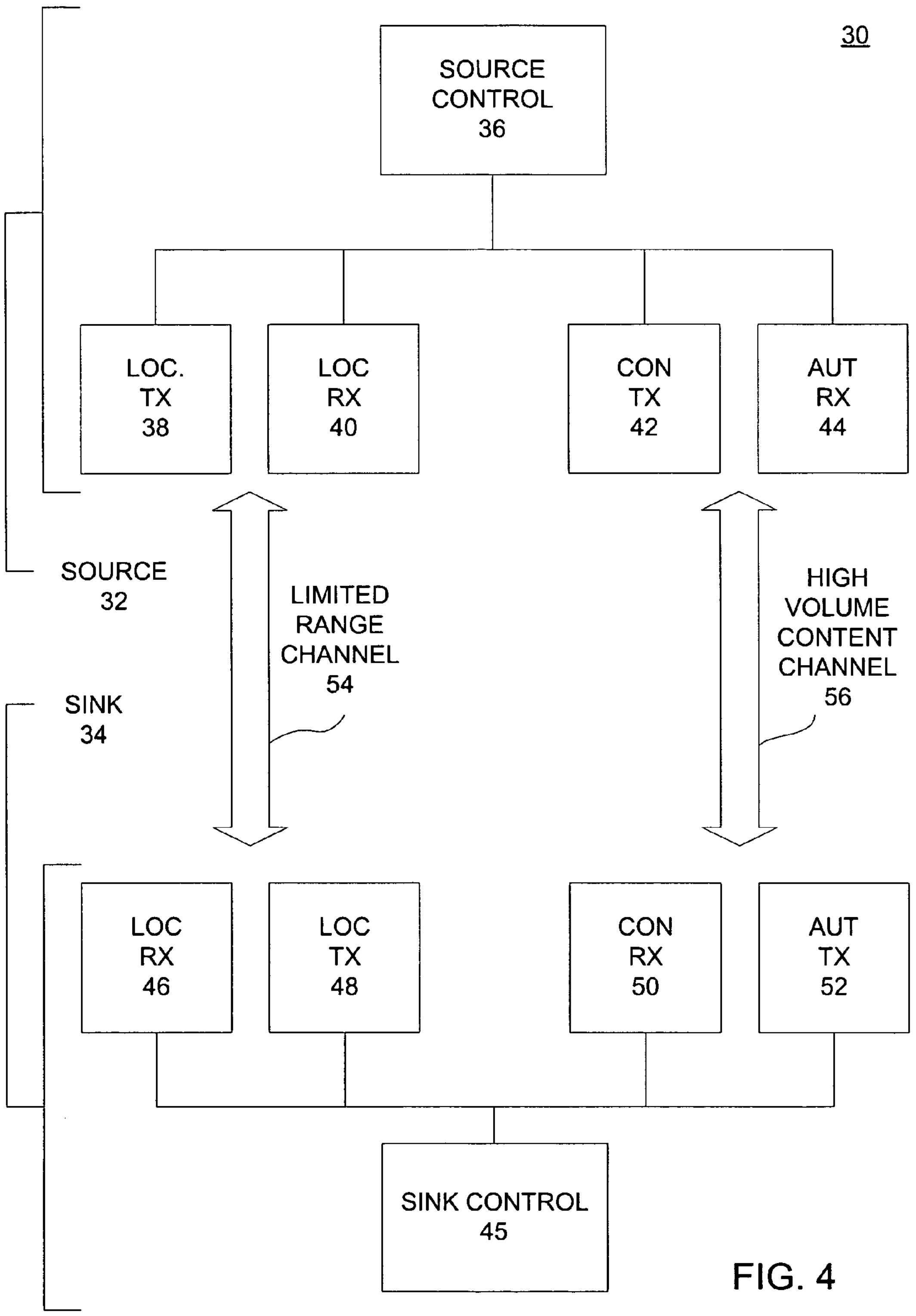
FIG. 4 shows a block diagram for a system that uses a combination of several techniques for localization.

Of course, a combination of any two, or all three techniques may be used as well. A system 30 if this kind is shown in FIG. 4. The system operates as follow. Initially, a sequence of messages is exchanged between a potential source 32 and sink 34 for the purposes of "discovery" (i.e., source and sink "discover" that they are connected to each other and can communicate through a common network), and authentication (i.e., that the sink 34 is indeed a device that should be allowed to receive (5C) content from source 34). The messages originate from the source control 36 and are transmitted by the content transmitter 42. These messages travel via a high volume content channel 56 to the sink 34.

At the sink, the content receiver 50 receives the messages, and sends them to the sink control 45. This latter system generates appropriate responses which are returned through the authentication transmitter 52 and channel 56 and authentication receiver 44. Channel 56 could be a wired (e.g. 1394) or wireless (e.g., 802.11) transmission medium.

As part of the initial messages, a PING signal may be transmitted as well (several times, if necessary), and the resultant RTT can be analyzed to determine if the distance between the source and the sink is not too big.

Once the source 32 and sink 34 exchange the appropriate handshake protocol and authentication is successful, a session key is sent from the source to the sink. In one embodiment of the invention, the discovery and authentication messages may be sent over the content channel 56, whereas the session key sent over a limited range localization medium, such as a beacon (which may be e.g., an RF, power line, infrared, or other beacon, as discussed above). Sending the session key over the beacon provides added confidence that the sink must be close enough, as the content cannot be reproduced at the sink without the session key. The key is initiated by source control 36 and transmitted through a localization transmitter 38 and channel 54, and received by the localization receiver 46 and the sink control 45. Sink control 45 generates an appropriate acknowledge signal sent over localization transmitter 48 and channel 54 to the soucer 32 through localization receiver 40.

To provide a further level of confidence that the sink is close enough, additional pinging may also be sent from the source to the sink across the limited range channel 54 and the resultant RTT is again measured and used to determine or confirm that the source and sink are close enough, geographically.

In another embodiment, the original handshake protocol takes place over the channel 56 and content is transmitted over the limited range channel 54.

In yet another embodiment, all communications between the source and the sink take place over the limited range channel 54 and the channel 56 is not used. Content exchange takes place over the short wireless medium such as 802.11. In such a case, all localization and authentication messages may flow over that medium.

In still another embodiment, several different paths are provided as a means of defining the limited range channel, with some of the messages being transmitted over one "subchanel" and data being transmitted over a different subchannel. For example, PING signals may be transmitted over a wireless means (e.g., 802.11 or bluetooth) while content is transmitted using a power line. In another embodiment, content flows over 802.11 wireless line while, pinging and RTT measurement may be undertaken via another limited range medium, such as power line. Various other combinations of channel usage may be employed by the system as well.

In the embodiments described above, a single beacon is used to transmit messages and content to a sink. In yet another embodiment, multiple beacons, not necessarily co-located with (a) potential content source(s). In such cases, the mode of operation described above in conjunction with the description of FIG. 4 may be extended to include verification by the potential content source that the sum of its distance from the beacon (as, e.g., measured from RTT) plus the distance of the sink to the beacon is sufficiently small as to allow the potential content source to authorize reproduction of content by the potential sink.

Numerous modifications may be made to the invention without departing from its scope as defined in the appended claims.

We claim:

1. A system for transmitting content within a predetermined region comprising:

a content source selectively transmitting control signals and content;

a first channel transmitting data and having an unrestricted range;

a second channel transmitting data and having a restricted range; and a sink connected to said content source by said first channel to receive content and being connected to said content source by a second channel to receive said control signals receiving said content, said sink being able to utilize said content only if it also receives said control signals over said second channel.

2. The system of claim 1 wherein said content is encoded, wherein said control signals include a key, and wherein said sink uses said key to decode said content.

3. The system of claim 1 wherein said source and said sink are adapted to exchange signals over said second channel.

4. The system of claim 1 wherein said source and sink exchange handshake messages before sending content.

5. The system of claim 1 wherein said source also transmits content over said second channel.

6. The system of claim 1 wherein said second channel is one of a wireless channel, an IR channel, and an AC line channel.

7. The system of claim 1 wherein said source sends an enabling control signal on said second channel to enable said sink to utilize said content.

8. The system of claim 7 wherein said source and said sink exchange indication signals and said source generates said enabling control signal based on an RTT value based on said indication signals.

9. The system of claim 8 wherein said source and said sink exchange a nonce as part of the indication signals and said enabling control signal is dependent on the presence of said nonce.

10. A system for transmitting content comprising:

a source transmitting a control signal over a limited range channel and selectively transmitting content when an acceptable response is received to said control signal; and a source receiving said control signal, generating a response corresponding to said control signal, and subsequently receiving said content.

11. The system of claim 10 wherein said control signal includes a PING signal and a nonce and said return includes said nonce.

12. The system of claim 10 wherein said content is transmitted over said limited range channel.

13. The system of claim 10 wherein said content is sent over a general channel.

14. The system of claim 10 wherein said control signal is sent over a wireless channel.

15. The system of claim 10 wherein said control signal is sent over one of a wireless channel, an IR channel and an AC line.

16. The system of claim 10 wherein said control signal is sent over a wireless channel and said content is sent over a wired channel.

17. The system of claim 10 wherein said control signal is sent over one of an IR channel, a wireless channel and an AC line, and content is sent over one of an IR channel a wireless channel and an AC line.

18. A method of distributing content from a source comprising the steps of:

determining whether a sink is within a preselected distance from a source by transmitting a control signal from the source over a limited range channel to said sink, the range of the limited range channel being within said preselected distance;

receiving said control signal by a sink;

returning a response signal responsive to said control signal by said sink; and in response transmitting said content to said sink.

19. The method of claim 18 wherein said content is sent over a general channel.

20. The method of claim 18 wherein said content is sent over a wired channel.

21. The method of claim 20 wherein said content is sent over a wireless channel.

22. A method of distributing content comprising the steps of:

transmitting a decoding key over a limited range channel;

receiving said decoding key by a sink;

transmitting said content in response to said acknowledgement; and decoding said content using said decoding key.

23. The method of claim 22 further comprising sending an acknowledgement by said sink responsive to said decoding key, wherein said content is transmitted responsive to said acknowledgement.

* * * * *